United States Patent Office 3,275,501
Patented Sept. 27, 1966

3,275,501
FUNGITOXIC AGENTS
Gerhard Schrader, Wuppertal-Cronenberg, and Paul-Ernst Frohberger, Burscheid, Germany, assignors to Farbenfabriken Bayer Aktiengesellschaft, Leverkusen, Germany, a German corporation
No Drawing. Filed June 3, 1964, Ser. No. 372,391
Claims priority, application Germany, June 4, 1963,
F 39,907
6 Claims. (Cl. 167—22)

The present invention relates to and has as its object fungitoxic agents based on thionothiolphosphoric and -phosphonic acid esters of the formula

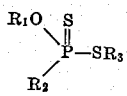

in which $R_1$ stands for a lower alkyl radical, $R_2$ for a lower alkyl, alkenyl, alkoxy or an optionally substituted lower alkylmercapto group, while $R_3$ is an optionally substituted lower alkyl radical.

As substituents for the radicals $R_2$ and $R_3$, principal examples are halogen atoms, cyano, thiocyano, hydroxy, alkoxy and alkylmercapto groups.

In German published application No. 1,073,237 and in U.S. patent specification No. 3,080,274, the O,O,O-trimethylthionophosphoric acid ester has already been described as being fungicidally active, but specifically active against fungi of the pythium group. It is also known from the above-mentioned U.S. patent specification that the corresponding O,O,O-triethyl compounds possesses substantially weaker fungitoxic properties when compared with the trimethyl ester, and its application as a fungicide or plant protective agent is therefore not considered in practice.

Furthermore, the O,O,O-trimethyl phosphoric acid ester or the S,S,S,-trimethyltrithiol-phosphorous acid ester and the S,S,S-trimethyl trithiolthiono-phosphoric acid ester are indicated as being inactive against plant pathogenic fungi in the cited U.S. patent specification.

It has now surprisingly been found that thionothiolphosphoric and -phosphonic acid esters of the abovementioned structure are distinguished by an especially strong fungitoxic activity and are thus outstandingly suited for combating undesired fungus growth.

The phosphoric acid esters of the present invention can be prepared by reactions well known in the prior art. The reactions are illustrated by U.S. Patents 2,494,284, 2,586,655 and 2,611,728.

In comparison to the known S,S,S,-trimethyl trithiolthiono-phosphoric acid ester, the compounds to be applied according to the invention possess a substantially increased fungitoxic effect, which is not limited only to fungi of the pythium group—as is the case with O,O,O-trimethylthiono-phosphoric acid esters—but extends further in an increased degree to representatives of the Rhizoctonia types as well as to numerous other pythopathogenic fungi.

In contrast to the products used for the same purpose according to the state of the art, the dialkyl-thionothiolphosphoric and -phosphonic acid esters of the invention thus possess the advantage of a higher fungitoxic degree of effect as well as a broader spectrum of activity. This behaviour is completely surprising and could not be foreseen in any way.

Moreover, the pythium-active O,O,O-trimethyl-thionophosphoric acid ester itself shows only a small degree of stability even at room temperature. The compound decomposes especially when finely distributed over a large surface (e.g. cellulose) with luminescence phenomena and development of smoke. In contrast, the O,O,S-trimethyl- or O,O,O-diethyl-S-methyl- and the O,O-dimethyl-S-ethyl-thionothiolphosphoride acid esters to be used according to the invention, for example, prove to be substantially more stable.

The compounds according to the invention are, moreover, distinguished to some extent by an extraordinarily low toxicity to warm blooded animals as well as a high tolerance by higher plants. They are, therefore, eminently suited for application against fungous plant diseases as well as for combating undesired fungous growth.

The products may be applied alone or in combination with other plant protective or pest control agents such as fungicides, insecticides, nematocides, herbicides, and cultivating aids, e.g. fertilizers and soil structure improvers. They can, moreover, be prepared with various preparation assistants, such as solvents, pulverulent extending, wetting or adhesive agents, dyestuffs and emulsifiers. They can be employed as concentrates, or extended with suitable inert materials, as powders, granulates, pastes, solutions, emulsions or suspensions. They are thus applied by atomizing, spraying, fumigating, sprinkling, scattering, dusting, pouring, injecting or in a dry, moist, wet or slurry dressing process.

The following examples are given for the purpose of illustrating the invention in more detail. The compounds to be used according to the invention and indicated below are characterised in the individual examples by the corresponding Roman numerals:

TABLE I

| Preparation No. | Constitution | Preparation No. | Constitution |
|---|---|---|---|
| I | CH₃O, CH₃O, P(=S), SCH₃ | II | CH₃O, CH₃O, P(=S), SC₂H₅ |
| III | C₂H₅O, C₂H₅O, P(=S), SCH₃ | IV | C₂H₅O, C₂H₅O, P(=S), SC₂H₅ |
| V | CH₃O, CH₃O, P(=S), S—CH₂—CN | VI | C₂H₅O, C₂H₅O, P(=S), S—CH₂—SCN |
| VII | CH₃O, CH₃S, P(=S), SCH₃ | VIII | C₂H₅O, CH₃S, P(=S), SCH₃ |

TABLE I—Continued

| Preparation No. | Constitution | Preparation No. | Constitution |
|---|---|---|---|
| IX | $C_2H_5O$–P(=S)($C_2H_5S$)($SC_2H_5$) | X | $CH_3O$–P(=S)($CH_3S$)($CH_3$) |
| XI | $C_2H_5O$–P(=S)($C_2H_5S$)($CH_3$) | XII | $C_2H_5O$–P(=S)($C_2H_5S$)($C_2H_5$) |
| XIII | $C_2H_5O$–P(=S)($CN$–$CH_2$–$S$)($CH$=$C(CH_3)$–$CH_3$) | XIV | $C_2H_5O$–P(=S)($Cl$–$CH_2$–$CH_2$–$S$)($CH$–$C(CH_3)$–$CH_3$) |
| XV | $C_2H_5O$–P(=S)($CN$–$CH_2$–$CH_2$–$S$)($CH$=$C(CH_3)$–$CH_3$) | XVI | $CH_3O$–P(=S)($CH_3O$)($SCH_2OH$) |
| XVII | $CH_3O$–P(=S)($CH_3O$)($SCH_2Cl$) | XVIII | $CH_3O$–P(=S)($CH_3O$)($SCH_2SC_2H_5$) |
| XIX | $nC_3H_7O$–P(=S)($nC_3H_7O$)($SCH_3$) | XX | $CH_3O$–P(=S)($iC_3H_7O$)($SCH_3$) |

Example 1

The fungitoxic activity and the breadth of the spectrum of activity of the compounds to be employed according to the invention are tested with the aid of the agar plate test. For this purpose, the preparation in question is dissolved in acetone in a proportion of 1:1 and these solutions are added to a potato-dextrose-agar in such an amount that a concentration of 0.1% active agent is present. The potato-dextrose-agar is previously liquified by heating and after thorough shaking with the preparation under sterile conditions, is then poured into Petri dishes. After the substrate-active agent mixture solidifies, 8 different phytopathogenic fungi are inoculated from pure cultures in discs of 5 mm. diameter. The action of the following fungi was tested:

(1) *Corticium rolfsii*
(2) *Sclerotinia sclerotiorum*
(3) *Verticillium alboatrum*
(4) *Thielaviopsis basicola*
(5) *Phytophthora cactorum*
(6) *Fusarium culmorum*
(7) *Fusarium oxysporum*
(8) *Fusarium solani*

After three days' incubation at 20° C. the evaluation proceeds by evaluating the mycelium growth or determination of the inhibiting action of the individual compounds. It is thus shown that, for example, the Preparations I, II, III, VI, VIII, X, XI, XII, XIII and XV indicated in Table I completely inhibit any mycelium growth.

Example 2

The applicability of the compounds according to the invention for combating fungous plant diseases is tested and shown by the following experiments: For testing as soil-treating agents against phytopathogenic soil fungi, the preparations in question are first diluted with talc to an active agent concentration of about 5%, and then, with the aid of finely divided quartz sand, extended to 0.5% and in this form admixed with the soil. For the tests against *Rhizoctonia solani*, thermally sterilised Fruhstorfer standard soil is inoculated with pure cultures of this fungus, while for the testing against *Pythium ultimum*, naturally infected compost soil is used, in which confirmed pythium-sensitive marrow fat peas almost exclusively perish of pythium rot. By using these two soils, vegetation experiments with marrow peas are carried out in the greenhouse at temperatures about 18° C. Three weeks after sowing, the number of healthy plants is determined as a measure of the protective action achieved by the preparations. In this way the plant tolerance of the individual active agents becomes apparent by a normal growth of the plants protected before infection. The experimental results obtained are assembled in the following Table II.

TABLE II

| Preparation No. | Active agent (Constitution) | Active agent concentration in mg./litre soil | No. of healthy plants in percent 3 wks. after sowing and infection with— | |
|---|---|---|---|---|
| | | | Rhizoctonia solani | Pythium ultimum |
| I | $CH_3O$–P(=S)($CH_3O$)($SCH_3$) | 2.5 | 46 | |
| | | 5 | 48 | |
| | | 10 | 68 | |
| | | 25 | 78 | 3 |
| | | 50 | 80 | 16 |
| | | 100 | 84 | 70 |

TABLE II—Continued

| Preparation No. | Active agent (Constitution) | Active agent concentration in mg./litre soil | No. of healthy plants in percent 3 wks. after sowing and infection with— | |
|---|---|---|---|---|
| | | | Rhizoctonia solani | Pythium ultimum |
| II | $(CH_3O)_2P(=S)SC_2H_5$ | 5<br>25<br>100 | 6<br>52<br>78 | |
| III | $(C_2H_5O)_2P(=S)SCH_3$ | 5<br>25<br>100 | 78<br>88<br>86 | |
| IV | $(C_2H_5O)_2P(=S)SC_2H_5$ | 5<br>25<br>100 | 6<br>44<br>88 | |
| V | $(CH_3O)_2P(=S)S-CH_2-CN$ | 54<br>25<br>100 | 0<br>2<br>90 | |
| VI | $(C_2H_5O)_2P(=S)S-CH_2-SCN$ | 5<br>25<br>100 | 0<br>34<br>86 | |
| VII | $(CH_3O)(CH_3S)P(=S)SCH_3$ | 5<br>25<br>100 | 12<br>74<br>86 | |
| VIII | $(C_2H_5O)(CH_3S)P(=S)SCH_3$ | 5<br>25<br>100 | 68<br>86<br>88 | |
| IX | $(C_2H_5O)(C_2H_5S)P(=S)SC_2H_5$ | 5<br>25<br>100 | 24<br>8<br>60 | |
| XI | $(C_2H_5O)(C_2H_5S)P(=S)CH_3$ | 5<br>25<br>100 | 10<br>30<br>76 | |
| XII | $(C_2H_5O)(C_2H_5S)P(=S)C_2H_5$ | 5<br>25<br>100 | 24<br>76<br>86 | |
| XIII | $(C_2H_5O)(CN-CH_2S)P(=S)CH=C(CH_3)_2$ | 5<br>25<br>100 | 20<br>70<br>72 | |
| XIV | $(C_2H_5O)(Cl-CH_2-CH_2-S)P(=S)CH=C(CH_3)_2$ | 5<br>25<br>100 | 50<br>72<br>86 | |
| XV | $(C_2H_5O)(CN-CH_2-CH_2-S)P(=S)CH=C(CH_3)_2$ | 5<br>25<br>100 | 16<br>88<br>88 | |
| | $(CH_3O)_2P(=S)-OCH_3$<br>(control preparation) | 25<br>100<br>500 | ---<br>0<br>0 | 20<br>62<br>80 |
| Sterilised soil untreated. | | | 85 | |
| Infected soil untreated. | | | 0 | 0 |
| XIX | $(nC_3H_7O)_2P(=S)SCH_3$ | 5<br>25<br>50<br>100 | 26<br>63<br>66<br>67 | |

TABLE II—Continued

| Preparation No. | Active agent (Constitution) | Active agent concentration in mg./litre soil | No. of healthy plants in percent 3 wks. after sowing and infection with— | |
|---|---|---|---|---|
| | | | Rhizoctonia solani | Pythium ultimum |
| XX | 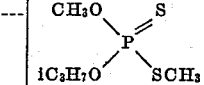 | 5<br>10<br>25<br>50<br>100 | 76<br>68<br>83<br>86<br>72 | |

Example 3

The sometimes substantial distant effect of the active agents employed according to the invention in the soil is tested with the aid of the following test arrangement:

70 milligrams of Preparation I, in the form of a 10% pumice grit granulate with a particle size of 0.5 to 1.5 mm. diameter, are introduced 5 cm. deep in a sandy soil. On the soil surface an agar plate in a Petri dish inoculated with Rhizoctonia solani is placed with its opening downwards, so that the fungus does not come into direct contact with the soil. A distant fungicidal effect through the 5 cm. high layer of soil becomes evident leading to a strong inhibition of the fungus growth on the agar plate.

Example 4

Preparation I, moreover, shows a substantial stability against hydrolytic influences:

After standing for 4 days a 10% slurry in water emulsified with 10% alkylaryl polyglycol ether, maintains an unaltered activity against Rhdizoctonia as is shown by vegetation experiments in the greenhouse. The preparation possesses a considerable stability also in the soil, as is apparent from the following experiment:

Sterilised Fruhstorfer standard soil is treated with various amounts of Preparation I in the form of a 0.5% talc-quartz sand-scattering powder, one part of the soil is inoculated immediately with pure Rhizoctonia solani cultures and simultaneously sown with peas, the other part inoculated and sown in the same way three weeks later. The test results obtained are shown in Table III.

We claim:

1. A method for controlling phytopathogenic fungi which comprises applying to said fungi a fungicidally effective amount of a compound of the formula $$\begin{array}{c}R_1O\\ \diagdown\\ R_2O\end{array}\!\!\!\!\!\!P\!\!\stackrel{S}{\underset{\|}{\phantom{P}}}\!\!-S-R_3$$

wherein $R_1$, $R_2$ and $R_3$ stand for lower alkyl having up to 4 carbon atoms.

2. The method of claim 1 wherein $R_1$, $R_2$ and $R_3$ stand for methyl, ethyl and n-propyl.

3. A method for controlling phytopathogenic fungi which comprises applying to said fungi a fungicidal amount of a phosphorus containing compound of the formula

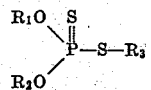

4. A method for controlling phytopathogenic fungi which comprises applying to said fungi a fungicidal amount of a phosphorus containing compound of the formula

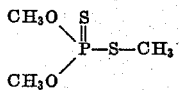

5. A method for controlling phytopathogenic fungi which comprises applying to said fungi a fungicidal

TABLE III

| Active agent | Active agent concentration in mg./litre soil | Number of healthy pea plants in percent 3 weeks after sowing | |
|---|---|---|---|
| | | Inoculated and sown simultaneously with soil treatment | Inoculated and sown 3 weeks after soil treatment |
| Pentrachloro-nitrobenzene (control preparation) | 50<br>100<br>100 | 50<br>37<br>57 | 48<br>62<br>84 |
| I) 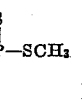 (according to invention) | 5<br>10<br>25 | 28<br>40<br>74 | 38<br>36<br>84 |
| Sterilized soil untreated | | 93 | 84 |
| Soil infected with Rhizoctonia solani untreated | | 0 | 0 |

From the experimental data given in Table III it is apparent that the fungicidal effect of the preparation according to the invention in the soil remains practically unaltered for 3 weeks similarly to the known control agent pentachloronitrobenzene.

amount of a phosphorus containing compound of the formula

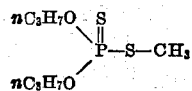

6. A method for controlling phytopathogenic fungi which comprises applying to said fungi a fungicidal amount of a phosphorus containing compound of the formula

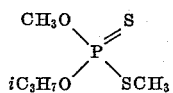

References Cited by the Examiner

UNITED STATES PATENTS

| | | | |
|---|---|---|---|
| 2,494,284 | 1/1950 | Cassady et al. | 260—461 |
| 2,586,655 | 2/1952 | Hook et al. | 260—461 |
| 2,611,728 | 9/1952 | Bartlett et al. | 167—22 |
| 2,856,325 | 10/1958 | Scott et al. | 167—22 |
| 2,911,335 | 11/1959 | Gilbert | 167—22 |
| 2,931,755 | 4/1960 | Birum | 167—22 |
| 2,941,920 | 6/1960 | Willard et al. | 167—22 |
| 2,967,123 | 1/1961 | Richter | 167—22 |
| 3,047,459 | 7/1962 | Perini et al. | 167—22 |
| 3,144,384 | 8/1964 | Aichenegg | 167—22 |
| 3,156,718 | 10/1964 | Lorenz et al. | 260—461 |

OTHER REFERENCES

"Organic Insectofungicides," Zhur. Obschei Khim., 30; 193–203 (1960), abstracted in English in Chem. Abstracts, 54: 22321e–22322f (1960).

LEWIS GOTTS, *Primary Examiner.*

SHEP K. ROSE, *Assistant Examiner.*